Figure 1:
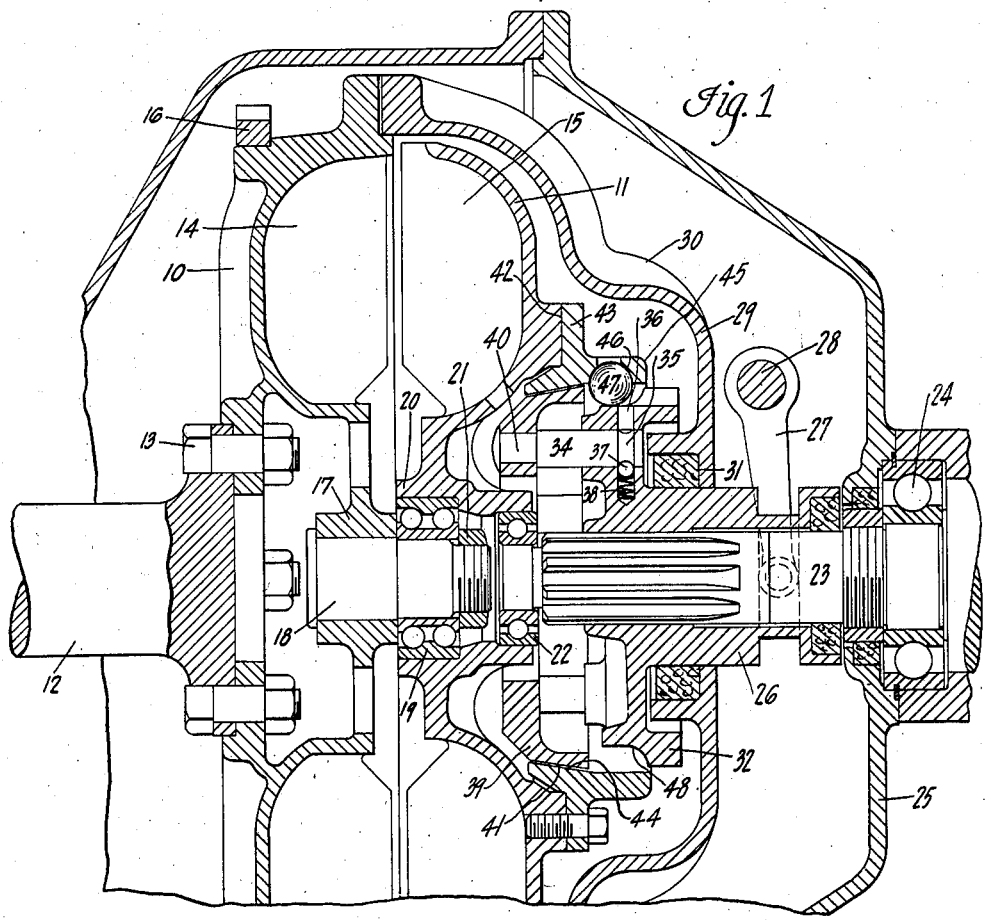

May 25, 1943.  F. W. AVILA  2,320,116

POWER TRANSMISSION MECHANISM

Filed June 6, 1941

Inventor
Frank W. Avila
By Paul O. Pippel
Att'y.

Patented May 25, 1943

2,320,116

UNITED STATES PATENT OFFICE 2,320,116

POWER TRANSMISSION MECHANISM

Frank W. Avila, Fort Wayne, Ind., assignor to International Harvester Company, a corporation of New Jersey Application June 6, 1941, Serial No. 396,895

5 Claims. (Cl. 192—3.2)

This invention relates to a power transmission mechanism and, more particularly, to a mechanism of the type including a hydraulic clutch or coupler in conjunction with a synchronizing unit.

A well known type of hydraulic coupler means is the Foettinger clutch disclosed in Patent No. 1,199,360, Sept. 26, 1916, to Herman Foettinger. A clutch of this type comprises, generally, a vaned driving member and a vaned driven member, to each of which is connected a shaft for driving various types of mechanisms. Fluid is directed between the members and because of the cooperation between the fluid and the vanes the members rotate together. It has been found in prior constructions that a direct connection between the driven member and the driven shaft is not desirable in all cases, especially when a change speed transmission is connected with the power transmission mechanism.

In one particular instance in which a clutch of the hydraulic type is used, the clutch forms part of the power transmission mechanism of an automotive vehicle. As is well known to those skilled in the art, the fluid between the driving and driven members of the clutch has a tendency to deliver engine torque even when the engine is idling. When the vehicle is parked, the foregoing circumstances require that the parking brake be set so that this torque will not serve to drive the vehicle.

Applicant has found that a disengageable connection between the driven member of the hydraulic coupler and the propeller shaft serves the purpose of eliminating the difficulties referred to above. However, if an ordinary clutch is used for this purpose, it will be seen that the clutch will have to be either a conventional friction clutch or a directly connectable positive clutch, or some other clutch of a heavy duty type capable of maintaining a connection between the propeller shaft and the driven member of the hydraulic clutch. It is not feasible to use a conventional type of friction clutch for the purpose of making this connection, because, for one reason, such a clutch would materially increase the size of the driving unit. A positive clutch will not serve the purpose in a desirable manner, inasmuch as the connection will be rather abruptly made and will necessarily prevent smooth and efficient operation of the mechanism.

According to the present invention, applicant has chosen one preferred form of construction in which the coupler between the hydraulic clutch and the propeller shaft consists of a combination friction and positive clutch. The clutch unit is sufficiently small so as to be compactly associated with the remainder of the driving mechanism. The friction clutch part is capable of establishing a temporary driving connection between the propeller shaft and the hydraulic clutch and is further capable of eliminating the abrupt connection between the propeller shaft and hydraulic clutch as would ordinarily be caused by immediate engagement of the positive clutch part. In addition, speed changes in the transmission may be more smoothly and speedily effected.

In its broader aspects, the invention consists of means between the driven member of the hydraulic clutch and the driven shaft for imparting rotation of one to the other to establish a predetermined ratio between the speeds of rotation thereof. More particularly, this means takes the form of a synchronizing unit. In the instance supposed above, where the driving connection is made while the vehicle is standing idle, engagement of the friction clutch would have the effect of applying a brake to the slowly rotating part of the hydraulic clutch, since the propeller shaft of the vehicle would not under those circumstances be rotating at the time the friction clutch is initially engaged. However, the same effect is obtained as when the friction clutch is engaged during relatively high speed operation of the propeller shaft. In both instances there is established between the hydraulic clutch and the propeller shaft a ratio of rotation permitting proper engagement of, first, the friction clutch, and second, the positive clutch. The invention includes and contemplates the foregoing and other phases of operation.

The principal object of the present invention is to provide a power transmission mechanism comprising a hydraulic or fluid clutch or coupler and means for connecting one of the members of the coupler to a shaft so that a predetermined ratio may be established between the speeds of rotation of the shaft and the member of the coupler.

Another important object is to provide this means in the form of a synchronizing unit.

An important object of the invention is to provide means for smoothly and efficiently connecting in driving relation the propeller shaft and the driven member of a hydraulic clutch in the power transmission mechanism of a vehicle or the like during various phases of operation of the mechanism, whether the shaft or driven member is rotating or standing idle.

Another object of the invention is to provide in the driven member of the hydraulic clutch, a clutch or braking element having a friction portion and a toothed portion and to provide on the shaft a clutch element having a friction portion and a toothed portion, respectively, interengageable with the portions on the first clutch element, the friction portions being initially engageable and the toothed portions being subsequently engageable.

Figure 2:
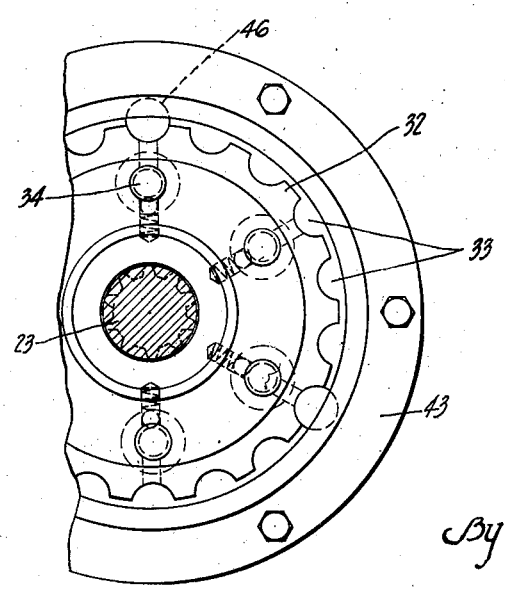

A more complete understanding of the invention, and of the foregoing and other objects and features, may be had from the following detailed description taken in conjunction with the accompanying sheet of drawings, in which:

Figure 1 is a longitudinal sectional view of a preferred from of the invention; and, Figure 2 is a rear view of the synchronizing unit.

As stated above, the main coupler or clutch is of the Foettinger type. As shown in the drawing, the clutch is indicated, generally, as having a driving member 10 and a driven member 11. The driving member 10 is carried by a shaft 12 for rotation therewith. This shaft may be the crank shaft of an ordinary internal combustion engine. The rear end of the shaft is flanged and has a plurality of bolts 13 for rigidly connecting the driving member 10 thereto. The member 10 is provided at its inner face with a plurality of radially directed vanes 14, and the driven member 11 is similarly vaned as at 15. The driving member 10 carries, about a portion of its outer periphery, a ring gear 16 adapted for engagement with the usual starting mechanism, not shown.

The inner portion of the driving member 10 includes an integral hub 17 which carries a stub shaft 18. The shaft 18 extends axially of the member and carries thereon an anti-friction bearing 19 which journals an integral inner hub 20 of the driven member 11. A nut 21 holds the bearing 19 in place upon the shaft 18. A rear portion of the hub 20 of the member 11 carries an anti-friction bearing 22 which serves to pilot the forward end of a shaft 23 disposed coaxially with the shaft 18. A rearward portion of the shaft 23 is journaled in an antifriction bearing 24 carried in part of a housing 25 which encloses the entire power transmission mechanism.

The shaft 23 is splined and carries thereon for rotation therewith a clutch element 26. This element is shiftable axially of the shaft 23 along the splined portion by means of a shifter fork 27 carried on a rock-shaft 28 which is journaled in the housing 25. An intermediate portion of the clutch element 26 is substantially cylindrical and extends through a rear wall 29 of a casing 30 which is connected to the clutch driving member 10. The member 10 and the casing 30 rotate together, and the rear wall 29 of the casing carries an oil and dust type seal 31 surrounding the intermediate portion of the clutch element 26.

The clutch element 26 includes an integral, circular face provided with a peripheral toothed portion 32, the teeth being in the form of a plurality of semicircular notches 33. The clutch element further carries a plurality of pins 34 extending from the face of the clutch element and paralleling the axis of rotation of the shaft 23. Each of the pins 34 is provided at its rear end with a circumferentially disposed groove 35. The clutch element includes a plurality of radial bores 36 each of which is alined with a groove 35 in a respective pin 34. The bore extends radially inwardly of the axis of the pin 34 and carries therein detent means comprising a small ball 37 spring-pressed into the groove 35 by a compression spring 38. The pins 34 extend entirely through the radial face of the clutch element 26 so that when they are released from the detent means they may have axial movement relative to the clutch element.

The forward ends of the pins 34 serve to carry a secondary part of the clutch element 26, this part taking the form of an annular clutch member 39 rigidly carried on reduced portions 40 of the pins 34. The outer periphery of the member 39 is generally conical and provides a friction face or portion 41. As will be seen from the foregoing description, the clutch element 26 which is carried on the shaft 23 for rotation therewith comprises the toothed clutch portion 32 and the friction clutch portion 41. As will be pointed out, these clutch parts cooperate with cooperating parts of a clutch element associated with the driven element 11 of the hydraulic coupler means.

The rear face of the driven member 11 is provided with an integral annular portion 42 which carries rigidly thereon a ring member 43. The member 43 comprises a second clutch element which includes a pair of annular portions, one of which extends axially toward the driven member 11 and is provided at its inner periphery with a conical friction face or portion 44. The other annular portion, generally indicated at 45, extends axially toward the toothed portion 32 of the clutch element 26. This portion 45 is provided with clutch teeth in the form of a plurality of semicircular sockets 46 into each of which is fitted a ball 47. The inner halves of the balls 47 engage an outer untoothed portion 48 of the clutch element 26 adjacent the toothed portion 32. In this manner, the balls 47 are retained in place between the clutch element 26 and the annular portion 45 of the clutch ring 43 on the member 11. The friction face 44 provides a friction clutch face cooperable with the friction face 41 on the member 39 of the clutch element 26.

In the operation of the preferred form of power transmission mechanism described above, fluid is supplied to the driving and driven members 10 and 11 in the usual manner so that the two rotate conjointly. When the parts are in the position shown in Figure 1, the members 10 and 11 rotate with respect to the shaft 23. In other words, the shaft 23 is not driven by the driven member 11. When it is desired to connect the shaft 23 to the hydraulic coupler member 11, the rock-shaft 28 is rocked and the shifter fork 27 shifts the clutch element 26 axially toward the hydraulic coupler means. Upon the initial shifting of the element 26 the friction face 41 thereof engages the friction face 44 of the clutch element 43 on the driven member 11. A continued shifting movement of the element 26 in the same direction releases the detent means 37 from the grooves 35 in the pins 34, thus permitting relative axial movement between the toothed portion 32 of the element 26 and the member 39, which has the friction face 41. Upon a continued axial movement, the toothed portion 32 of the clutch element 26 becomes engaged with the balls 47 which are carried by the clutch element 43 on the driven coupler member 11, the balls providing in effect a toothed portion on the member 11 engageable with the toothed portion 32 on the clutch element 26.

One of the advantages of the foregoing description is that initial shifting of the clutch element 26 with respect to the driven member 11 engages the friction face 41 and 44, thus imparting to the shaft 23 initial rotary movement from the driven member 11. In this manner, it is possible to synchronize the speeds of rotation of the member 11 and the shaft 23 or otherwise to establish a predetermined ratio between those speeds of rotation. After the speeds of rotation have been synchronized, or the predetermined ratio established, the toothed portion, consisting of the notches 33 on the element 26 and the balls 47 on the ring 43, are engaged to provide a positive driving connection between the shaft 23 and the driven member 11.

It will be apparent to those skilled in the art that the advantages that may be derived from the preferred construction illustrated and described may be similarly attached in modified forms of the power transmission mechanism. The hydraulic or fluid coupling means may be of any form, and it is not necessary that the particular embodiment illustrated be employed. Similarly, the synchronizing unit, which comprises the elements 26 and 43, may be of any form.

It will be obvious that other modifications and alterations may be made in the preferred construction illustrated without departing from the spirit and scope of the invention as defined in the appended claims.

What is claimed is:

1. Power transmission mechanism comprising, in combination, a pair of coaxial shafts, hydraulic coupling means between the shafts including a driving member and a driven member arranged for rotation about the axis of the shafts, means connecting one of the members to one of the shafts for rotation therewith, friction clutch elements on the second member and the second shaft respectively and engageable for first frictionally engaging said second member and second shaft, and positive clutch elements on said second member and second shaft respectively and positively engageable for subsequently connecting said second member and second shaft for rotation together after the initial connection has been effected.

2. Power transmission mechanism comprising, in combination, a pair of shafts, hydraulic coupling means between the shafts including a rotatable driving member and a rotatable driven member, means connecting one of the members to one of the shafts for rotation therewith, friction clutch elements connected to the second member and the second shaft respectively and engageable for first frictionally engaging said member and shaft, positive clutch elements connected to said second member and second shaft respectively and positively engageable for subsequently connecting said second member and second shaft for rotation together after the initial connection has been effected.

3. Power transmission mechanism comprising, in combination, a pair of shafts, hydraulic coupling means between the shafts including a rotatable driving member and a rotatable driven member, means connecting one of the members to one of the shafts for rotation therewith, a clutch element associated with the second member and including a friction portion and a toothed portion, a clutch element associated with the second shaft and including a friction portion and a toothed portion, the friction portions of the elements being interengageable for first frictionally connecting said second member and second shaft, and said toothed portions of the elements being subsequently interengageable to connect said second shaft and second member for ultimate rotation together.

4. Power transmission mechanism comprising, in combination, a pair of shafts, hydraulic coupling means between the shafts including a rotatable driving member and a rotatable driven member, means connecting one of the members to one of the shafts for rotation therewith, a clutch element on and rotatable with the second member and including a friction portion and a toothed portion, a clutch element rotatable with and axially shiftable on the second shaft and including a friction portion and a toothed portion, the second element being shiftable first to engage the friction portions for first frictionally connecting said second member and second shaft and then to engage said toothed portions to connect said second shaft and second member for ultimate rotation together.

5. Power transmission mechanism comprising, in combination, a pair of shafts, hydraulic coupling means between the shafts including a rotatable driving member and a rotatable driven member, means connecting one of the members to one of the shafts for rotation therewith, a clutch element on and rotatable with the second member and including a friction portion and a ring carried by said clutch element for rotation therewith and including a plurality of balls arranged in the ring in circumferentially spaced relation and having portions projecting radially from the ring, a clutch element rotatable with and axially shiftable on the second shaft and including a friction portion and a portion provided with a plurality of circumferentially spaced, axially extending grooves, the second element being shiftable first to engage the friction portions for first frictionally connecting said second member and second shaft and then to engage said grooves with the balls to connect said second shaft and second member for ultimate rotation together.

FRANK W. AVILA.